(12) United States Patent
Liu (10) Patent No.: US 11,694,655 B2
(45) Date of Patent: Jul. 4, 2023

(54) VIDEO PLAY SYSTEM, VIDEO PLAY DEVICE, AND VIDEO PLAY METHOD

(71) Applicant: TCL CHINA STAR OPTOELECTRONICS TECHNOLOGY CO., LTD., Guangdong (CN)

(72) Inventor: Jinfeng Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 113 days.

(21) Appl. No.: 17/599,527

(22) PCT Filed: Jun. 18, 2021

(86) PCT No.: PCT/CN2021/100818
§ 371 (c)(1),
(2) Date: Sep. 28, 2021

(87) PCT Pub. No.: WO2022/241892
PCT Pub. Date: Nov. 24, 2022

(65) Prior Publication Data
US 2022/0375433 A1  Nov. 24, 2022

(30) Foreign Application Priority Data
May 20, 2021 (CN) .......................... 202110554006.3

(51) Int. Cl.
*G06F 3/038* (2013.01)
*G09G 5/14* (2006.01)
*G09G 5/12* (2006.01)

(52) U.S. Cl.
CPC ................. *G09G 5/14* (2013.01); *G09G 5/12* (2013.01); *G09G 2300/026* (2013.01); *G09G 2310/0264* (2013.01)

(58) Field of Classification Search
CPC ...... G09G 5/14; G09G 5/12; G09G 2300/026; G09G 2310/0264
(Continued)

(56) References Cited

U.S. PATENT DOCUMENTS

2007/0024705 A1* 2/2007 Richter .............. H04N 21/6587
348/E7.086
2011/0191577 A1* 8/2011 Tian ..................... H04N 21/812
713/150
(Continued)

FOREIGN PATENT DOCUMENTS

| CN | 101349820 A | 1/2009 |
|---|---|---|
| CN | 104219527 A | 12/2014 |

(Continued)

*Primary Examiner* — Jonathan M Blancha
(74) *Attorney, Agent, or Firm* — Hamre, Schumann, Mueller & Larson, P.C.

(57) ABSTRACT

A video play system, a video play device, and a video play method are provided. The video play system includes: a display module and a plurality of play modules electrically connected to the display module. The plurality of play modules individually decode and transcode a video source having first resolution to generate target video data, and simultaneously output the target video data generated themselves to the display module. The display module plays a video image having second resolution according to multiple channels of the target video data.

20 Claims, 9 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 2013/0215973 | A1* | 8/2013 | Fujimoto | H04N 21/2365 |
| | | | | 375/240.24 |
| 2016/0330460 | A1* | 11/2016 | Doshi | H04N 19/436 |
| 2018/0276850 | A1* | 9/2018 | Igarashi | G06T 7/97 |
| 2019/0208237 | A1* | 7/2019 | Harish | H04N 21/2665 |
| 2020/0014944 | A1* | 1/2020 | Zhang | H04N 19/436 |
| 2020/0337799 | A1* | 10/2020 | Ito | H04N 21/4312 |

FOREIGN PATENT DOCUMENTS

| | | |
|---|---|---|
| CN | 110493626 A | 11/2019 |
| CN | 111447394 A | 7/2020 |
| WO | 2020189817 A1 | 9/2020 |

* cited by examiner

VIDEO PLAY SYSTEM, VIDEO PLAY DEVICE, AND VIDEO PLAY METHOD

The present disclosure relates to a field of video play technologies, and more particularly, to a video play system, a video play device, and a video play method which can process 16K resolution.

BACKGROUND

With rapid development of internet technologies and mobile communication technologies, the world enters a brand new "message generation." Contents of messages become increasingly diverse day by day. As an important constituting part of a message industry, display technologies are vital in developing processes of message technologies. Nowadays, a variety of display devices have been used in many fields of human's daily life and work. Liquid crystal display (LCD) technologies are a mature second-generation display technology, and while another new-generation display technology is increasingly enhanced day by day, the LCD technologies constantly strive for excellence so as to provide LCD devices having a better performance and improved stability to users.

Quality of an image outputted by display devices is affected by display resolution of the display devices and image resolution of a video source. In one aspect, a number of pixels displayed by a visible interface of the display devices is determined by the display resolution. The greater a value of the display resolution, the higher accuracy of images outputted by the display devices. In another aspect, for display devices having a high display resolution value, a video source needs to have a corresponding value of the image resolution to ensure a corresponding accuracy of the image outputted by the display devices. In addition, the display devices need to include a play system that can process the video source.

For example, display devices having a 7680×4320 display resolution (8K) (hereafter called 8K display devices) have already been launched in the market. Also, a play system used in the 8K display devices can decode and output video sources having the 7680×4320 display resolution (hereafter called 8K video sources). However, 16K display devices lack 16K video sources and a play device that can process the 16K video sources. Therefore, conventional play devices can only decode and transcode video sources having the display resolution of 8K or below 8K. Video data obtained by decoding and transcoding is amplified or copied to convert the 8K display resolution into 16K display resolution. Finally, video data having 16K resolution is outputted to the 16K display devices, thereby displaying an image having 16K display resolution. It should be understood that quality of the image obtained by above method cannot represent quality of images corresponding to real 16K video sources and cannot represent a real display effect of the 16K display devices.

SUMMARY

The present disclosure provides a video play system, a video play device, and a video play method to solve following technical issues: conventional 16K display devices lack 16K video sources and a play device that can process the 16K video sources. Therefore, they cannot play a full and real video image having 16K resolution.

To solve the above issues, technical solutions provided by the present disclosure are described as follows:

In one aspect, the present disclosure provides a video play system, comprising a plurality of play modules and a display module, wherein each of the play modules is electrically connected to the display module. The play modules simultaneously receive a video source having a first resolution, individually decode and transcode the received video source to generate target video data, and simultaneously output the target video data generated themselves to the display module. The display module displays a video image having a second resolution according to the target video data received by the play modules.

In another aspect, the present disclosure provides a method of playing video, comprising following steps: individually decoding and transcoding a plurality of video sources having a first resolution to form a plurality of channels of target video data; and displaying a video image having a second resolution according to the channels of target video data.

In yet another aspect, the present disclosure provides a video play device, comprising a plurality of play modules, wherein each of the play modules is electrically connected to an external display module; and the play modules simultaneously receive a video source having a first resolution, individually decode and transcode the received video source to generate target video data, and simultaneously output the target video data formed themselves to the external display module, thereby allowing the external display module to display a video image having a second resolution according to a plurality of channels of the target video data.

Exemplarily, in the above solutions, the first resolution is an 8K resolution, and the second resolution is 16K resolution.

Regarding the beneficial effects: in a video play system, a video play device, and a video play method provided by the present disclosure, four play modules simultaneously output four channels of video source having an 8K resolution to 16K display module. Therefore, the display module can display a full and real video image having 16K resolution, which ensures users' visual experiences.

DETAILED DESCRIPTION

Embodiments are further described below in detail with reference to accompanying drawings to make objectives, technical solutions, and effects of the present disclosure clearer and more precise. It should be noted that described embodiments are merely used to construct the present disclosure and are not intended to limit the present disclosure.

Figure 1:
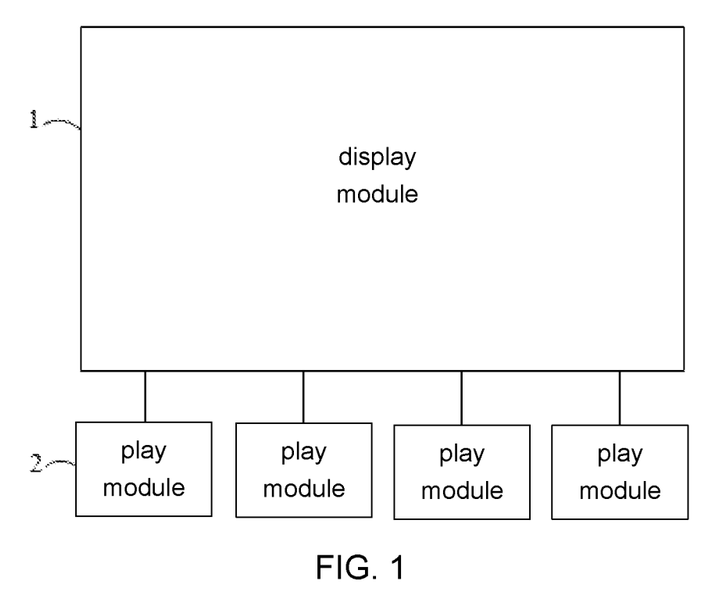
FIG. 1 is a structural schematic view showing a video play system provided by an embodiment of the present disclosure.

In one aspect, the present disclosure provides a video play system. A structure of the video play system is as shown in FIG. 1 and includes a display module 1 and a plurality of play modules 2. Wherein, each of the play modules 2 is electrically connected to the display module 1. The play modules 2 simultaneously receive a video source having first resolution, and individually decode and transcode the received video source to generate target video data. After that, the play modules 2 simultaneously output the target video data generated themselves to the display module 1. The display module 1 displays a video image having second resolution according to a plurality of channels of the target video data received from the play modules 2.

Figure 2:
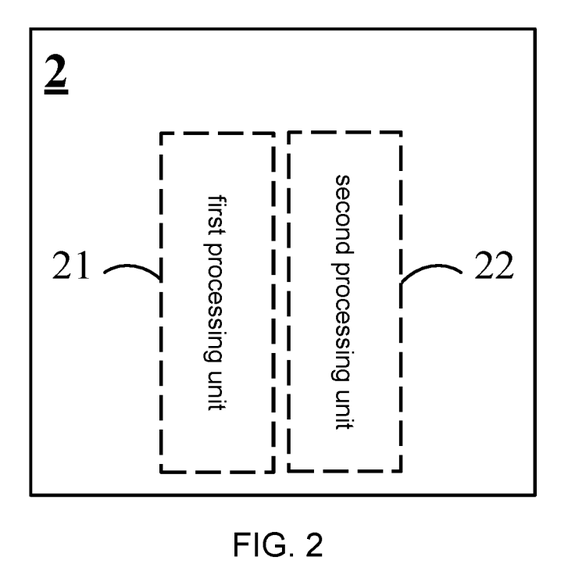
FIG. 2 is a structural schematic view showing a play module provided by an embodiment of the present disclosure.

In some embodiments of the present disclosure, each of the play modules 2 includes a first processing unit 21 and a second processing unit 22 as shown in FIG. 2. Wherein, the first processing unit 21 is configured to decode the video source having the first resolution and is configured to output video data having a first format to the second processing unit 22. The second processing unit 22 is configured to transcode the video data having the first format and is configured to output a target video data having a second format to the display module 1.

Hereinafter, the video play system provided by the present disclosure is exemplarily described in conjunction with a first embodiment and a second embodiment.

First Embodiment

Figure 3:
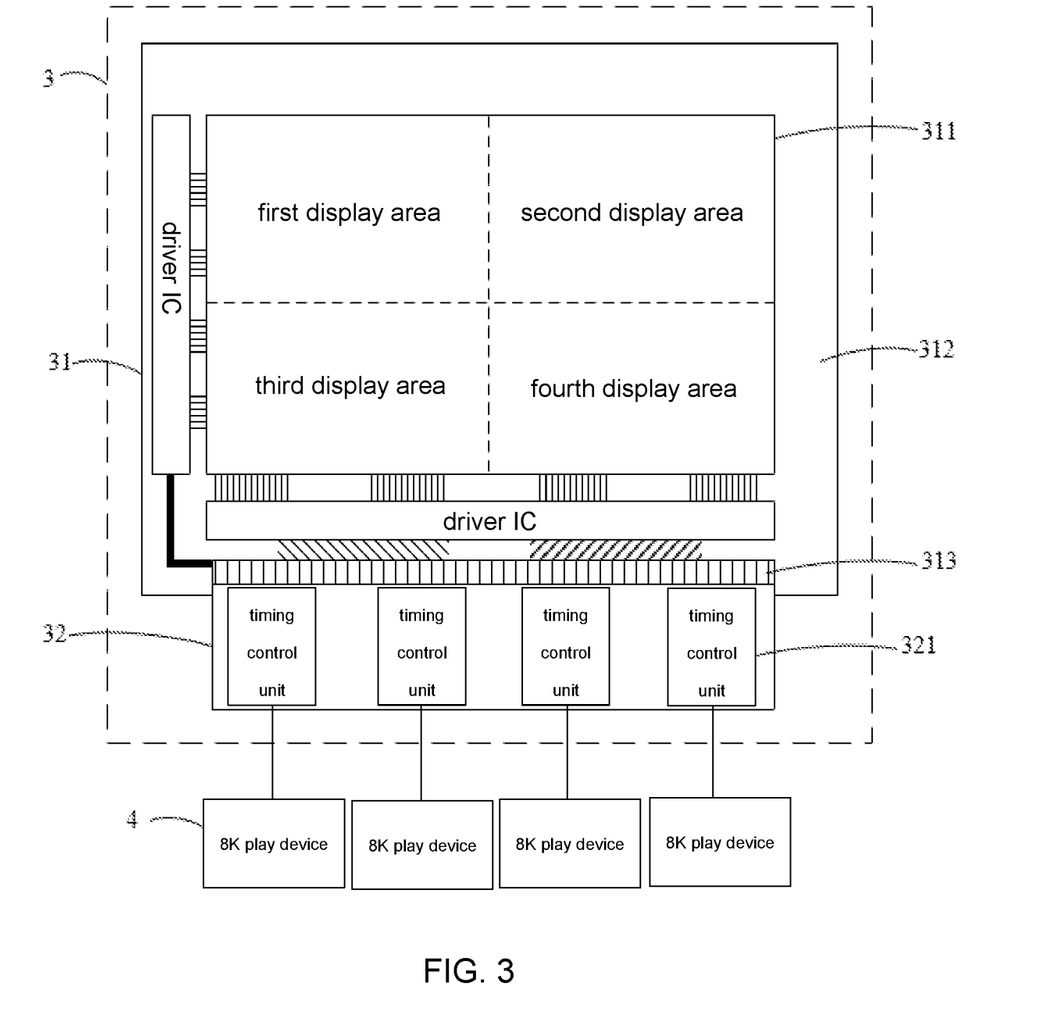
FIG. 3 is a structural schematic view showing a video play system provided by a first embodiment of the present disclosure.

In the present embodiment, exemplarily, the plurality of play modules 2 include four play modules. The first resolution is 8K resolution, and the second resolution is 16K resolution.

Moreover, display resolution of the display module is 16K (hereafter called 16K display module 3). The four play modules are 8K play devices 4 as shown in FIG. 3 which can process video sources having resolution up to 8K. Specifically, a display area 311 of the 16K display module 3 is divided into four areas as shown in FIG. 3, namely a first display area, a second display area, a third display area, and a fourth display area.

The four 8K play devices 4 simultaneously receive a video source having 8K image resolution, individually decode and transcode the received video source to generate target video data, and simultaneously output the target video data generated themselves to the 16K display module 3.

Figure 5:
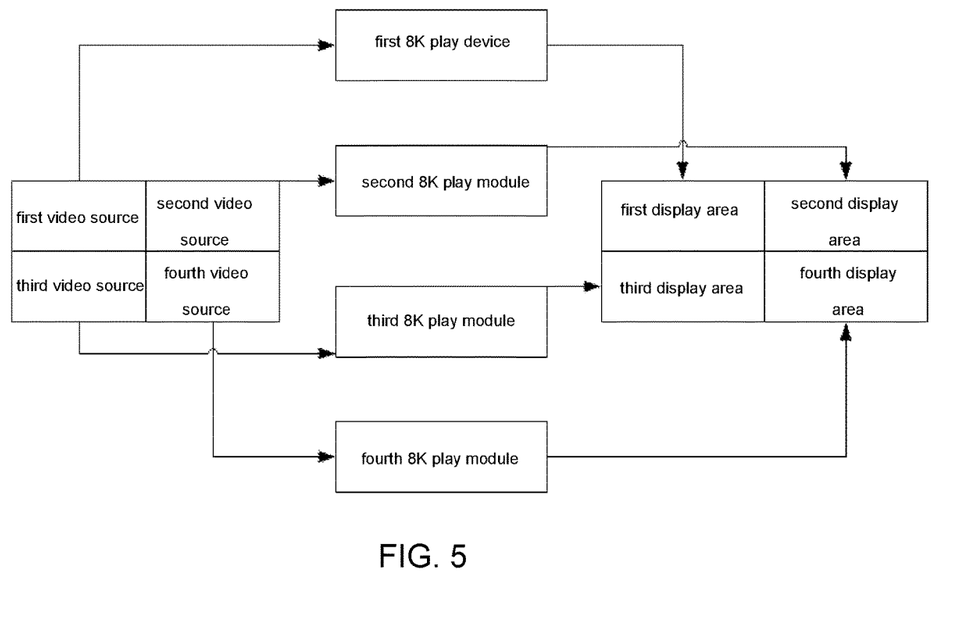
FIG. 5 is a schematic view showing data transmission between four 8K play devices and a 16K display module provided by the first embodiment of the present disclosure.

As shown in FIG. 5, four channels of the target video data and the four display areas of the 16K display module 3 have a one-to-one correspondence relationship. The 16K display module 3 displays a full video image having 16K resolution according to the four channels of the target video data.

Specifically, a first 8K play device receives a first video source having 8K image resolution, and decodes and transcodes the first video source to generate a first channel of the target video data. A second 8K play device receives a second video source having 8K image resolution, and decodes and transcodes the second video source to generate a second channel of the target video data. A third 8K play device receives a third video source having 8K image resolution, and decodes and transcodes the third video source to generate a third channel of the target video data. A fourth 8K play device receives a fourth video source having 8K image resolution, and decodes and transcodes the fourth video source to generate a fourth channel of the target video data. Then, the four 8K play devices 4 simultaneously output the target video data generated themselves to the 16K display module 3.

Figure 4:
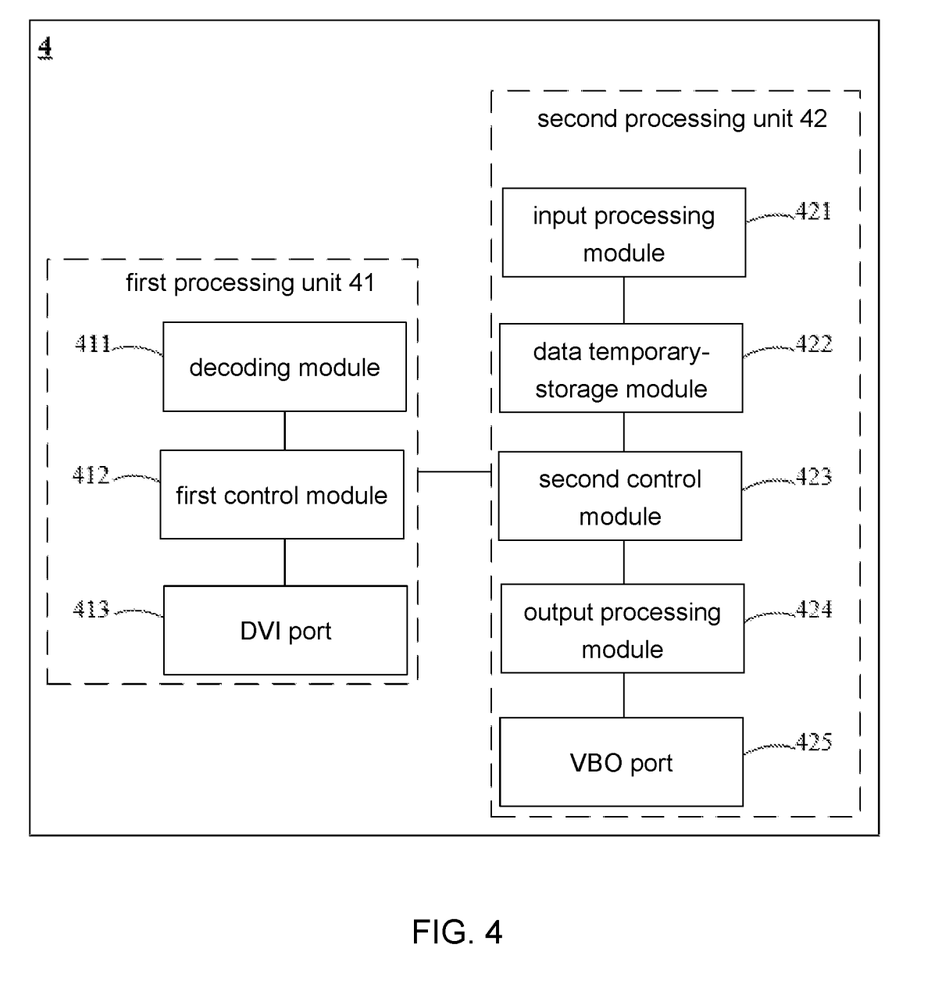
FIG. 4 is a structural schematic view showing an 8K play device provided by the first embodiment of the present disclosure.

In the present embodiment, each of the 8K play devices 4 has a structure as shown in FIG. 4, including a first processing unit 41 and a second processing unit 42.

Wherein, the first processing unit 41 includes a decoding module 411, a first control module 412, and a digital visual interface (DVI) port 413. In the present embodiment, the decoding module 411 is an 8K decoding chip that can decode video sources having 8K image resolution. The first control module 412 is a system on chip (SOC) chip that can output video data obtained by decoding to the second processing unit 42 by the DVI port 413.

In the present embodiment, the second processing unit 42 processes and transcodes video data having a DVI format (first format), and outputs the target video data obtained by transcoding to the 16K display module 3 by a V-By-One (VBO) port 425.

Specifically, the second processing unit 42 includes an input processing module 421, a data temporary-storage module 422, a second control module 423, an output processing module 424, and a VBO port 425. Wherein, after the input processing module 421 receives video data having a DVI format, it writes corresponding video data into the data temporary-storage module 422. The second control module 423 reads the video data in the data temporary-storage module 422 and writes the video data into the output processing module 424. The output processing module 424 transcodes the received video data into video data which can be received by the 16K display module 3 and outputs target video data having a VBO format (second format) to the 16K display module 3 by the VBO port 425.

In the present embodiment, the 16K display module 3 includes a display panel 31 and a timing control module 32 as shown in FIG. 3. Wherein, the display panel 31 includes a display area 311, a surrounding area 312, and a terminal area 313. The timing control module 32 is electrically connected to the display panel 31 by a bonding effect of a conductive terminal in the terminal area 313.

In the present embodiment, the timing control module 32 includes four timing control units 321. The four timing control units 321 are timing control integrated circuits (TCON ICs) integrated on the timing control module 32. The four timing control units 321 are configured to respectively receive four channels of the target video data having the VBO format from the four 8K play devices 4, are configured to convert a format of the target video data into a format which can be accepted by the display panel 31, and are configured to output the target video data to a driver IC of the display panel 31 according to a corresponding relationship between each channel of the target video data and each of the display areas as shown in FIG. 5.

The driver IC is disposed on the surrounding area 312 of the display panel 31 in an array manner. In addition, the driver IC includes a gate driver IC and a source driver IC. Wherein, the gate driver IC is mainly configured to open a plurality of thin-film transistors (TFTs) of a plurality of pixel units in each of the display areas. The source driver IC is mainly configured to write received target video data into the pixel units when the TFTs of the pixel units are opened, thereby driving the display panel 31 to play a full video image having 16K resolution corresponding to the four channels of the target video data.

Above-mentioned pixel units are distributed in the display area 311 in an array manner. Moreover, in the 16K display module 3, the display area 311 includes 15360 columns of pixels. Furthermore, each column includes 8640 pixel units.

Compared with conventional technologies, the video play system (FIG. 3) provided by the present embodiment individually decodes and transcodes four 8K video sources by the four 8K play devices 4, and simultaneously outputs the four channels of the target video data to the 16K display module 3, thereby allowing the 16K display module 3 to display the full and real video image with 16K resolution. Therefore, a visual experience of users is improved.

Second Embodiment

Figure 6:
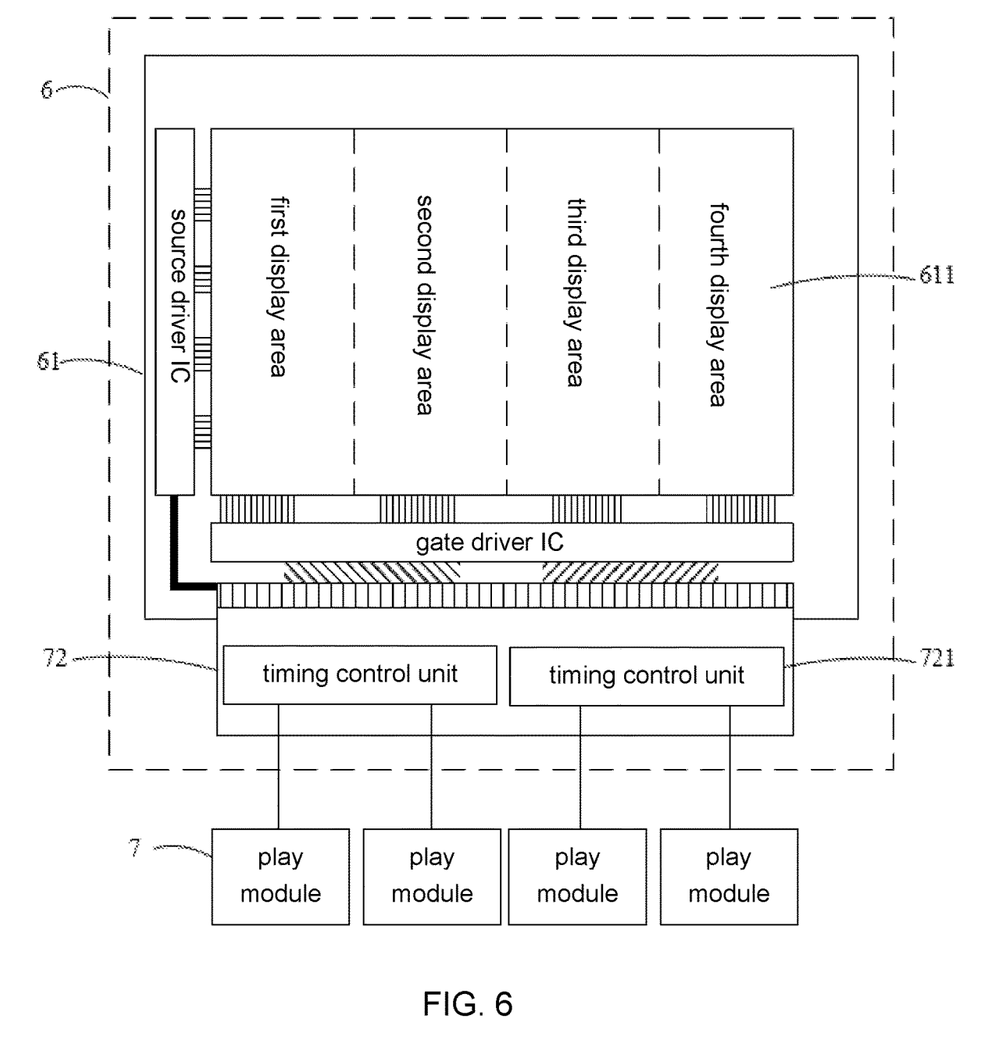
FIG. 6 is a structural schematic view showing a video play system provided by a second embodiment of the present disclosure.

In the present embodiment, exemplarily, play modules 2 are four play modules 7. First resolution is 8K resolution, and the second resolution is 16K resolution. Furthermore, a display module 6 has 16K resolution, and the play modules 7 can process video sources having 8K image resolution.

Figure 7:
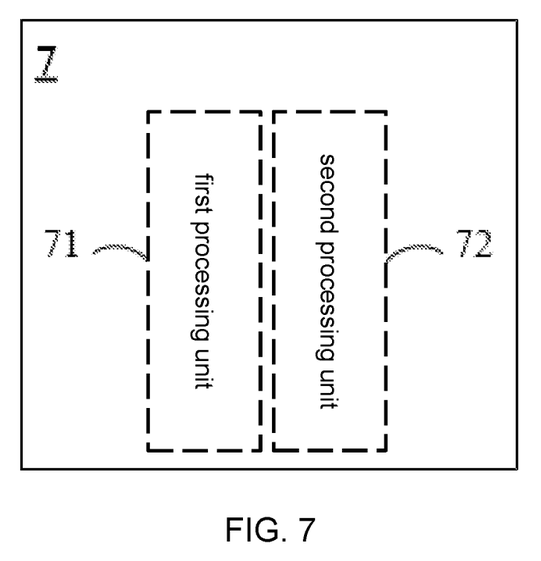
FIG. 7 is a structural schematic view showing a play module provided by the second embodiment of the present disclosure.

Specifically, a display area 611 of the display module 6 is divided into four areas as shown in FIG. 6, namely a first display area, a second display area, a third display area, and a fourth display area. Each of the play modules 7 includes a first processing unit 71 and a second processing unit 72 as shown in FIG. 7.

The first processing units 71 of the four play modules 7 simultaneously receive a video source having 8K resolution, and individually decode the received video source. In addition, the first processing unit 71 of each of the play modules 7 can recognize data in odd columns and data in even columns before it outputs a video source obtained by decoding to the second processing unit 72. The second processing unit 72 can transcode and integrate multiple channels of the data in the odd columns or multiple channels of the data in the even columns received by the second processing unit 72, thereby outputting a channel of target video data. The four play modules 7 simultaneously output the target video data generated by themselves to the 16K display module.

Figure 8:
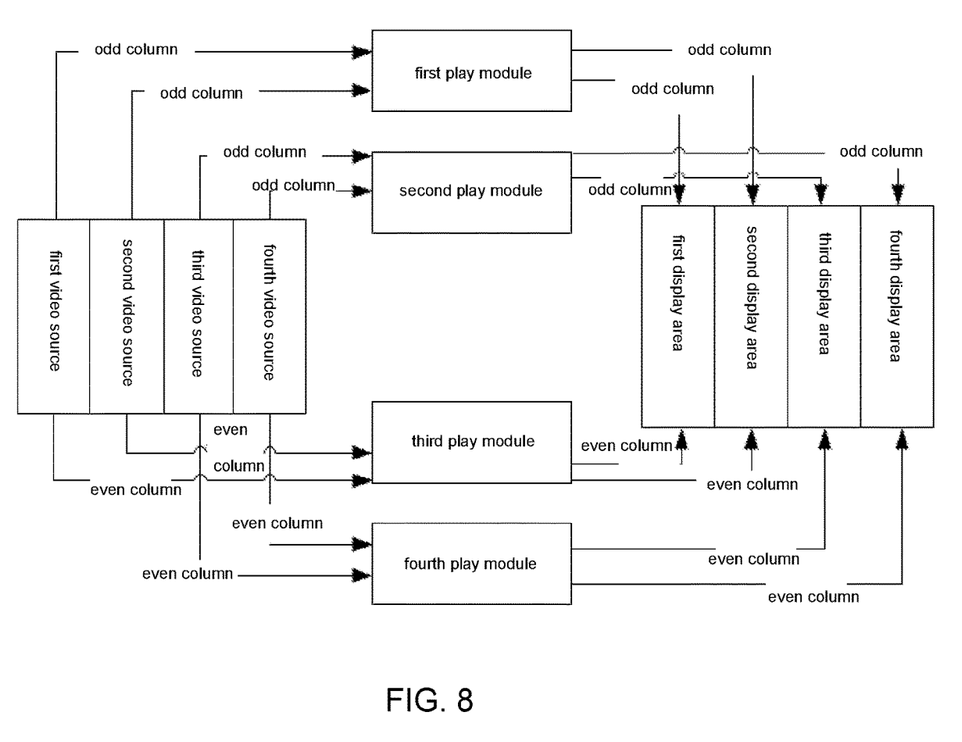
FIG. 8 is a schematic view showing data transmission between four play modules and a display module provided by the second embodiment of the present disclosure.

Specifically, as shown in FIG. 8, the first processing unit of the first play module receives a first video source and a second video source which have 8K image resolution, and decodes the first video source and the second video source to obtain first video data and second video data. Then, the first processing unit of the first play module outputs data in odd columns of the first video data and the second video data to the second processing unit of the first play module. The first processing unit of the second play module receives a third video source and a fourth video source which have 8K image resolution, and decodes the third video source and the fourth video source to obtain third video data and fourth video data. Then, the first processing unit of the second play module outputs data in odd columns of the third video data and the fourth video data to the second processing unit of the second play module. The first processing unit of the third play module receives a first video source and a second video source which have 8K image resolution, and decodes the first video source and the second video source to obtain first video data and second video data. Then, the first processing unit of the third play module outputs data in even columns of the first video data and the second video data to the second processing unit of the third play module. The first processing unit of the fourth play module receives a third video source and a fourth video source which have 8K image resolution, and decodes the third video source and the fourth video source to obtain third video data and fourth video data. Then, the first processing unit of the fourth play module outputs data in even columns of the third video data and the fourth video data to the second processing unit of the fourth play module.

After that, the second processing unit of the first play module transcodes two channels of received data in the odd columns, and integrates the two channels of the received data in the odd columns into first channel target video data. The second processing unit of the second play module transcodes two channels of received data in the odd columns, and integrates the two channels of the received data in the odd columns into second channel target video data. The second processing unit of the third play module transcodes two channels of received data in the even columns, and integrates the two channels of the received data in the even columns into third channel target video data. The second processing unit of the fourth play module transcodes two channels of received data in the even columns, and integrates the two channels of the received data in the even columns into fourth channel target video data. Then, the second processing units of the four play modules simultaneously output the target video data generated themselves to the display module 6.

Moreover, the first channel target video data corresponds to odd-column pixels in the first display area and the second display area of the display module 6. The second channel target video data corresponds to odd-column pixels in the third display area and the fourth display area of the display module 6. The third target video data corresponds to even-column pixels in the first display area and the second display area of the display module 6. The fourth target video data corresponds to even-column pixels in the third display area and the fourth display area of the display module 6.

In the video play system provided by the present embodiment of the present disclosure, during processes of outputting the target video data, the odd-column pixels and the even-column pixels of the display panel 1 are cross-driven by an above-mentioned outputting method by recognizing the odd and the even columns.

Specifically, a timing control unit 721 of the timing control module 72 receives the four channels target video data, and outputs the four channels target video data to a display panel 61 according to a predetermined format requirement and a timing requirement. A gate driver IC in the display panel 61 scans a pixel unit array in each of the display areas column by column according to a predetermined timing requirement, and a source driver IC writes corresponding target video data into each of the pixel units, thereby driving the display panel 61 to display a full video image having 16K resolution.

In conclusion, the video play system of the present embodiment has better flexibility in terms of processing video sources and transporting video data. For example, output formats of the video data can be correspondingly adjusted according to a structure of a driver IC and requirements of a driving timing in a display module.

In another aspect, the present disclosure provides a video playing method, including following steps: individually decoding and transcoding a plurality of video sources having first resolution to form a plurality of channels of target video data; and displaying a video image having second resolution according to the plurality of channels of the target video data.

Hereinafter, the video play method provided by the present embodiment is exemplarily described in conjunction with a third embodiment and a fourth embodiment.

Third Embodiment

Figure 9:
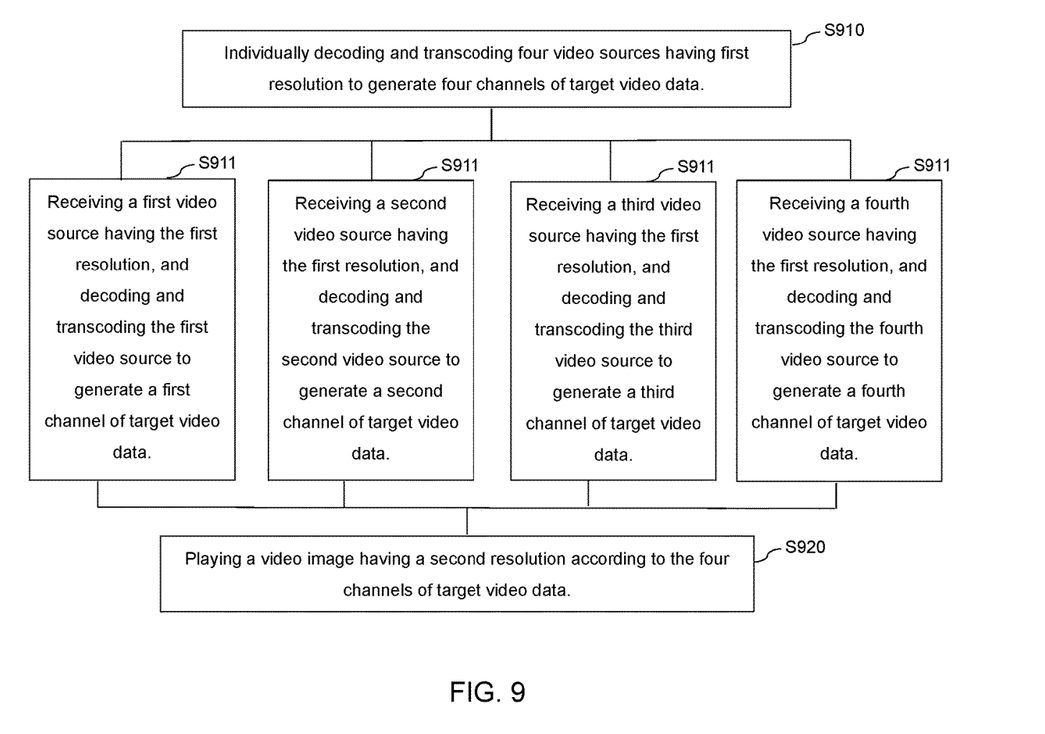
FIG. 9 is a schematic view showing steps of a video play method provided by a third embodiment of the present disclosure.

As shown in FIG. 9, a video play method includes following steps:

S910: individually decoding and transcoding four video sources having first resolution to generate four channels of target video data; and S920: playing a video image having second resolution according to the four channels of the target video data.

In the present embodiment, the first resolution is 8K and the second resolution is 16K. Moreover, the step S910 specifically includes following steps as shown in FIG. 9:

S911:

receiving a first video source having the first resolution, and decoding and transcoding the first video source to generate a first channel of target video data;

receiving a second video source having the first resolution, and decoding and transcoding the second video source to generate a second channel of target video data;

receiving a third video source having the first resolution, and decoding and transcoding the third video source to generate a third channel of target video data; and receiving a fourth video source having the first resolution, and decoding and transcoding the fourth video source to generate a fourth channel of target video data.

The step S920 is sequentially conducted according to the first channel of the target video data, the second channel of the target video data, the third channel of the target video data, and the fourth channel of the target video data generated in the step S911.

Compared with conventional technologies, in the video play method provided by the present embodiment, four video sources having 8K image resolution are individually decoded and transcoded, and four channels of target video data having 8K image resolution are simultaneously outputted, thereby driving an external display module to play a full and real video image having 16K resolution. This video play method can ensure a visual experience for users.

Fourth Embodiment

Figure 10:
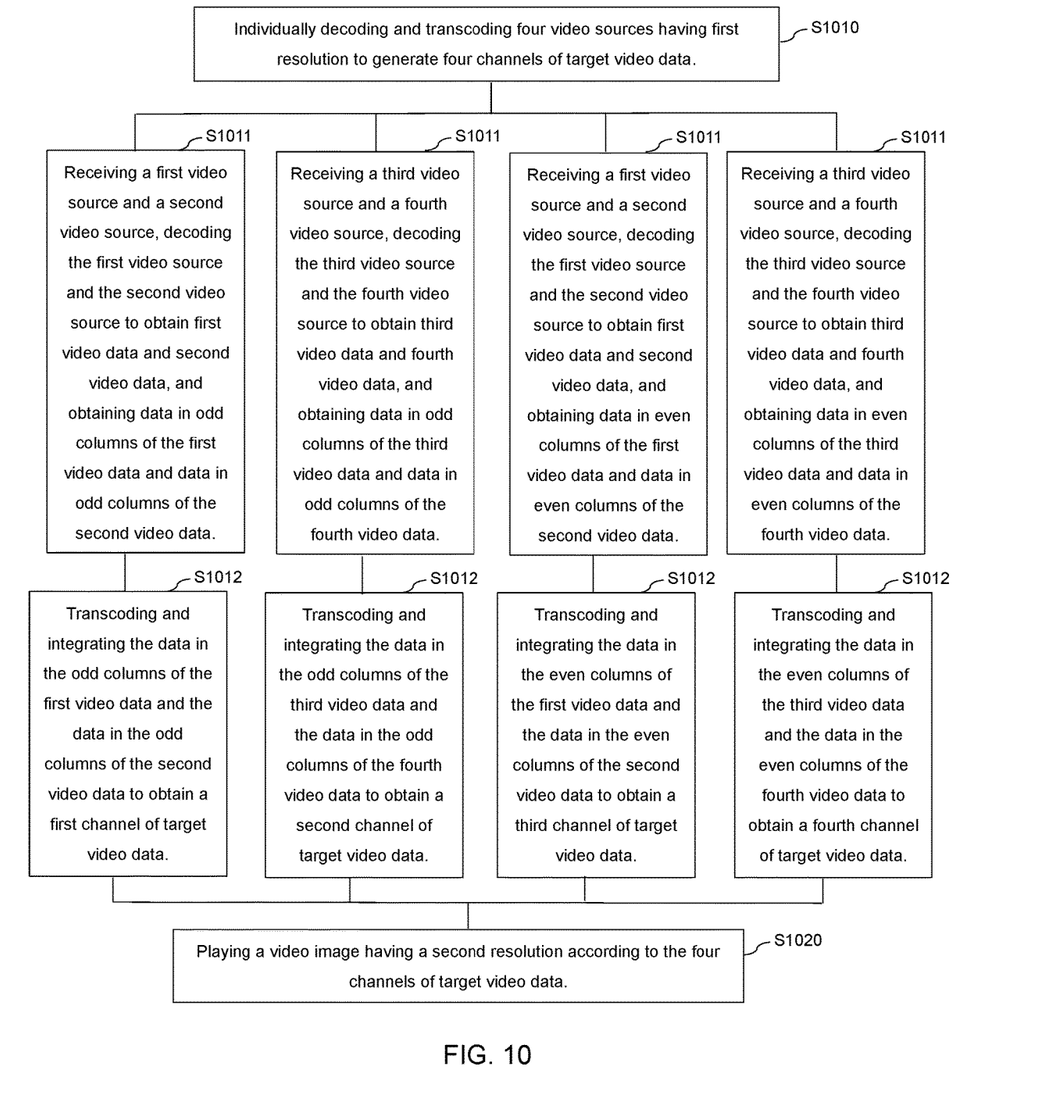
FIG. 10 is a schematic view showing steps of a video play method provided by a fourth embodiment of the present disclosure.

As shown in FIG. 10, a video play method provided by the present embodiment includes following steps:

S1010: individually decoding and transcoding four video sources having first resolution to generate four channels of target video data; and S1020: playing a video image having second resolution according to the four channels of the target video data.

In the present embodiment, the four video sources, which are simultaneously inputted, are noted as a first video source, a second video source, a third video source, and a fourth video source, respectively. Moreover, each of the video sources has 8K image resolution (first resolution). A video image having 16K image resolution (second resolution) can be played according to the target video data corresponding to the four video sources.

Specifically, the step S1010 includes following steps as shown in FIG. 10:

S1011:

receiving the first video source and the second video source, decoding the first video source and the second video source to obtain first video data and second video data, and obtaining data in odd columns of the first video data and data in odd columns of the second video data;

receiving the third video source and the fourth video source, decoding the third video source and the fourth video source to obtain third video data and fourth video data, and obtaining data in odd columns of the third video data and data in odd columns of the fourth video data;

receiving the first video source and the second video source, decoding the first video source and the second video source to obtain first video data and second video data, and obtaining data in even columns of the third video data and data in even columns of the fourth video data; and receiving the third video source and the fourth video source, decoding the third video source and the fourth video source to obtain third video data and fourth video data, and obtaining data in even columns of the third video data and data in even columns of the fourth video data.

S1012:

transcoding and integrating the data in the odd columns of the first video data and the data in the odd columns of the second video data to obtain a first channel of target video data;

transcoding and integrating the data in the odd columns of the third video data and the data in the odd columns of the fourth video data to obtain a second channel of target video data;

transcoding and integrating the data in the even columns of the first video data and the data in the even columns of the second video data to obtain a third channel of target video data;

transcoding and integrating the data in the even columns of the third video data and the data in the even columns of the fourth video data to obtain a fourth channel of target video data.

The step S1020 is sequentially conducted according to the first channel of the target video data, the second channel of the target video data, the third channel of the target video data, and the fourth channel of the target video data generated in the step S1012 to display a full video image having 16K image resolution.

In the video play method provided by the present embodiment, during processes of outputting target video data, data in odd columns and data in even columns of video data can be recognized, and multiple channels of the data in the odd columns or the data in the even columns can be further integrated. Therefore, target video data which only have the data in the even columns or the data in the odd columns are obtained. These data are configured to drive an external display module to cross-drive the even columns and the odd columns.

It should be understood by a person having ordinary skill in the art that all or part of processes of the video play method provided by above-mentioned embodiments can be realized by hardware and/or software relating to a computer program. The computer program can be stored in a computer-readable storage medium of non-volatile computers. When the computer program is conducted, the processes described in the above-mentioned embodiments can be conducted. Wherein, memories, databases, or other media described in each of the embodiments of the present disclosure may include non-volatile memories and/or volatile memories. The non-volatile memories may include a read-only memory (ROM), a programmable read-only memory (PROM), an electrically programmable read-only memory (EPROM), an electrically-erasable programmable read-only memory (EEPROM), or a flash memory. The volatile memories may include a random-access memory (RAM) or an external cache. Above examples are only for description and do not limit the present disclosure. The RAM may include multiple forms such as a static random-access memory (SRAM), a dynamic random-access memory (DRAM), a synchronous dynamic random-access memory (SDRAM), an enhanced synchronous dynamic random-access memory (ESDRAM), a direct rambus dynamic random-access memory (DRDRAM), and a rambus dynamic random-access memory (RDRAM).

In yet another aspect, the present disclosure further provides a video play device, including a plurality of play modules. Each of the play modules is electrically connected to an external display module. Wherein, the play modules simultaneously receive a video source having first resolution, and individually decode and transcode the received video source to generate target video data. Then, the play modules simultaneously output the target video data generated themselves to the display module, thereby allowing the display module to display a video image having second resolution according to multiple channels of target video data.

Exemplarily, in the video play device disclosed by the present disclosure, each of the play modules includes a first processing unit and a second processing unit. Wherein the first processing unit is configured to decode a video source having the first resolution, and is configured to output video data having a first format to the second processing process. The second processing unit is configured to transcode the video data having the first format, and is configured to output video data having a second format to the display module. A function and a working principle of the play modules of the video play device provided by the present disclosure are same as or similar to a function and a working principle of the play modules described in the first embodiment and the second embodiment, and are not described again here.

It should be noted that a structure of components, a relationship of signal outputting, and a method of dividing a display area described in the above-mentioned embodiments are only examples and do not limit technical solutions provided by the present disclose. For example, a position of a driver IC in the display panel can be appropriately adjusted according to specifications, such as a type, a size, and performance, of display products. Furthermore, a method of transporting video data between the play modules and the display module also should be adjusted according to a predetermined driving requirement of the display module. Moreover, a number and a size of display areas are not limited to the above-mentioned embodiments. When a capability of a play device to process a video source and the size and a shape of the display areas are changed, a method of dividing the display areas and contents of the video sources corresponding to each of the display areas should be correspondingly adjusted.

It should be noted that many changes and modifications to the described embodiment can be carried out by those skilled in the art, and all such changes and modifications are intended to be included within the scope of the appended claims.

What is claimed is:

1. A video play system, comprising a plurality of play modules and a display module, wherein each of the play modules is electrically connected to the display module;
    the play modules simultaneously receive a video source having first resolution, individually decode and transcode the video source to generate target video data, and simultaneously output the target video data generated themselves to the display module; and
    the display module plays a video image having second resolution according to a plurality of channels of the target video data received from the plurality of play modules.

2. The video play system of claim 1, wherein the plurality of play modules comprise four play modules, and the display module displays the video image having the second resolution according to four channels of the target video data received from the four play modules.

3. The video play system of claim 2, wherein each of the play modules comprises a first processing unit and a second processing unit;
    the first processing unit is configured to decode the video source having the first resolution and outputs video data having a first format to the second processing unit; and
    the second processing unit is configured to transcode the video data having the first format and outputs target video data having a second format to the display module.

4. The video play system of claim 3, wherein the four channels of the target video data respectively correspond to four display areas of the display module.

5. The video play system of claim 4, wherein in the four play modules, a first play module receives a first video source having the first resolution and decodes and transcodes the first video source to form a first channel of target video data;
    in the four play modules, a second play module receives a second video source having the first resolution and decodes and transcodes the second video source to form a second channel of target video data;
    in the four play modules, a third play module receives a third video source having the first resolution and decodes and transcodes the third video source to form a third channel of target video data;
    in the four play modules, a fourth play module receives a fourth video source having the first resolution and decodes and transcodes the fourth video source to form a fourth channel of target video data; and
    the four play modules simultaneously output the target video data generated themselves to the display module.

6. The video play system of claim 3, wherein in the four play modules, the first processing unit of a first play module receives a first video source and a second video source having the first resolution, decodes the first video source and the second video source to obtain first video data and second video data, and outputs data in odd columns of the first video data and data in odd columns of the second video data to the second processing unit of the first play module;
    in the four play modules, the first processing unit of a second play module receives a third video source and a fourth video source having the first resolution, decodes the third video source and the fourth video source to obtain third video data and fourth video data, and outputs data in odd columns of the third video data and data in odd columns of the fourth video data to the second processing unit of the second play module;

in the four play modules, the first processing unit of a third play module receives the first video source and the second video source having the first resolution, decodes the first video source and the second video source to obtain first video data and second video data, and outputs data in even columns of the first video data and data in even columns of the second video data to the second processing unit of the third play module; and in the four play modules, the first processing unit of a fourth play module receives the third video source and the fourth video source having the first resolution, decodes the third video source and the fourth video source to obtain third video data and fourth video data, and outputs data in even columns of the third video data and data in even columns of the fourth video data to the second processing unit of the fourth play module.

7. The video play system of claim 6, wherein in the four play modules, the second processing unit of the first play module transcodes two channels of data in the odd columns received, and integrates the two channels of the data in the odd columns into a first channel of target video data;

in the four play modules, the second processing unit of the second play module transcodes the two channels of data in the odd columns received, and integrates the two channels of the data in the odd columns into a second channel of target video data;

in the four play modules, the second processing unit of the third play module transcodes two channels of data in the even columns received, and integrates the two channels of the data in the even columns into a third channel of target video data;

in the four play modules, the second processing unit of the fourth play module transcodes two channels of data in the even columns received, and integrates the two channels of the data in the even columns into a fourth channel of target video data; and the second processing units of the four play modules simultaneously output the target video data generated themselves to the display module.

8. The video play system of claim 7, wherein the first channel of the target video data corresponds to odd columns of pixels in a first display area and a second display area of the display module, the second channel of the target video data corresponds to odd columns of pixels in a third display area and a fourth display area of the display module, the third channel of the target video data corresponds to even columns of pixels in the first display area and the second display area of the display module, and the fourth channel of the target video data corresponds to even columns of pixels in the third display area and the fourth display area of the display module.

9. The video play system of claim 3, wherein the first format is digital visual interface (DVI), and the second format is V-by-One (VBO).

10. The video play system of claim 1, wherein the display module comprises a display panel and a timing control module; and the display panel comprises a terminal area, a conductive terminal is disposed in the terminal area, and the timing control module is electrically connected to the display panel by the conductive terminal.

11. The video play system of claim 10, wherein the timing control module comprises at least one timing control unit configured to receive the target video data outputted by the four play modules, and the timing control unit outputs the target video data to the display panel according to a predetermined time sequence.

12. The video play system of claim 11, wherein the display panel further comprises a display area and a surrounding area; and the surrounding area is provided with a driver integrated circuit (driver IC) configured to write the target video data inputted by the timing control unit into a pixel unit in the display area, thereby driving the display panel to play a video image having the second resolution.

13. The video play system of claim 12, wherein the driver driver IC comprises a gate driver IC configured to open a thin-film transistor (TFT) of the pixel unit.

14. The video play system of claim 12, wherein the driver IC further comprises a source driver IC, and the source driver IC is configured to write the target video data into the pixel unit when the TFT of the pixel unit is opened.

15. The video play system of claim 1, wherein the first resolution is 8K resolution, and the second resolution is 16K resolution.

16. A method of playing video, comprising following steps:

individually decoding and transcoding a plurality of video sources having first resolution to form a plurality of channels of target video data; and displaying a video image having second resolution according to the channels of the target video data.

17. The method of claim 16, wherein the plurality of video sources having the first resolution comprise four video sources having the first resolution, and the plurality of channels of the target video data comprise four channels of the target video data.

18. The method of claim 16, wherein the first resolution is 8K resolution, and the second resolution is 16K resolution.

19. A video play device, comprising a plurality of play modules, wherein each of the play modules is electrically connected to an external display module; and the plurality of play modules simultaneously receive a video source having a first resolution, individually decode and transcode the video source to generate target video data, and simultaneously output the target video data generated themselves to a display module, thereby allowing the display module to display a video image having a second resolution according to a plurality of channels of the target video data.

20. The video play device of claim 19, wherein each of the play modules comprises a first processing unit and a second processing unit;

the first processing unit is configured to decode the video source having the first resolution, and outputs a video data having a first format to the second processing unit; and the second processing unit is configured to transcode the video data having the first format, and outputs target video data having a second format to the display module.

* * * * *